(12) United States Patent
Ruiz et al.

(10) Patent No.: US 6,215,622 B1
(45) Date of Patent: *Apr. 10, 2001

(54) LAMINATED HARD DISK HEAD SUSPENSION AND ETCHING PROCESS

(75) Inventors: Oscar Jaime Ruiz, San Jose; Mathew Kayhan Shafe, Campbell, both of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/582,001

(22) Filed: Jan. 2, 1996

(51) Int. Cl.[7] ............................... G11B 5/48; G11B 21/21
(52) U.S. Cl. ..................................... 360/244.3; 360/244.5
(58) Field of Search ................................. 360/104, 103, 360/244.3, 244.5

(56) References Cited

U.S. PATENT DOCUMENTS

| | | | |
|---|---|---|---|
| 4,996,623 | * 2/1991 | Erpelding et al. | 360/104 |
| 5,065,271 | * 11/1991 | Matsuura et al. | 360/104 |
| 5,187,625 | 2/1993 | Blaeser et al. | 360/104 |
| 5,198,945 | 3/1993 | Blaeser et al. | 360/104 |
| 5,282,103 | 1/1994 | Hatch et al. | 360/104 |
| 5,313,365 | 5/1994 | Hagen | 360/104 |
| 5,353,181 | 10/1994 | Frater et al. | 360/104 |
| 5,528,819 | * 6/1996 | McKay et al. | 360/104 |

* cited by examiner

Primary Examiner—Robert S. Tupper
(74) Attorney, Agent, or Firm—Altera Law Group, LL

(57) ABSTRACT

A suspension system for disk drives is formed out of a multi-layer metal laminate. An etch-retardant layer is received between two outer metal layers at a pre-determined depth from the outer surfaces of the metal layers. Utilizing conventional photo-chemical etching process techniques, the etch retardant layer stops or retards the chemical etching at this pre-determined depth. In this manner, the inherent variably in etch rate is controlled, permitting the formation of finer geometries in the head suspension than would be otherwise possible.

12 Claims, 3 Drawing Sheets

LAMINATED HARD DISK HEAD SUSPENSION AND ETCHING PROCESS

BACKGROUND OF THE INVENTION

1. Field of the Invention

The present invention relates to a head suspension assembly for a data storage system, and, more particularly, to such an assembly wherein the head suspension is manufactured using a laminate or clad composite sheet metal having one or more etch-stop layers formed therein.

2. Description of the Prior Art

Direct access storage devices of the type known as "Winchester" disk drives, or merely "disk drives", are well known in the computer industry. Disk drives store information on concentric, recorded tracks written on one or more rotatable magnetic recording disks. A magnetic head or transducer element is provided for each such disk, and moves from track to track, to either read previously stored information or to record information on the magnetic tracks ("read"-"write", respectively). The electromagnetic transducer typically is carried in a slider body mechanism that is supported over the surface of a rotating disk by a self-acting, hydrodynamic air bearing.

The slider body/transducer combination is referred to collectively as a "head", and it is attached to a suspension assembly that suspends and loads the head toward the disk surface. The suspension assembly is in turn connected to a rotary or linear actuator that controllably moves the head from track to track on the disk, in response to electrical signals generated by controlling circuitry. To aid in accurate tracking, the head is attached to the suspension assembly in a manner that permits the head to gimbal. In this manner, variations in head orientation necessitated by the radial repositioning of the head, relative to the magnetic disk surface, can be easily accommodated.

The trend towards increasing density of memory storage devices has not escaped disk drives, which have decreased in size while their data storage capacity has increased. Continuing improvements in the magnetic recording media, the head designs, and the control circuitry have permitted the data tracks to become smaller and closer together. The large suspensions used in older disk drives are too stiff to support the required high precision positional adjustment of the smaller, lighter-weight heads and sliders. Lighter and more selectively flexible suspension systems are required. Such suspensions must be increasingly flexible in the vertical direction to accurately track with the lighter heads, while remaining rigid in the horizontal or lateral direction to prevent unwanted side-to-side movement and the resultant mistracking.

During the initial period of disk size reductions, this problem was addressed by utilizing suspension members of ever decreasing thickness, with proportionally increasing ratios of width to thickness. However, as improvements in head and control circuit technology continued to permit further downsizing, stainless steel, the material of choice for manufacturing suspension members, reached its lower milling thickness. Below about 0.025 mm. in thickness, irregularities in stainless steel grain structure result in thickness variations that make steel of such dimensions unsuitable for use in suspensions.

With mechanical methods for shaping the extremely thin metal stock ruled out, the manufacturers of suspension assemblies have turned to photo-chemical etching techniques. This well-known technology for creating printed circuit boards of unfathomable complexity appeared to offer great promise for use in creating the small geometries required to achieve the desired bending characteristics in suspension assemblies. After the initial milling and stamping operations, a photo-etch resist pattern is applied to a suspension member blank. A chemical solvent is applied to remove metal from the exposed areas, thereby achieving the fine geometries necessary to the operation of the suspension member. The removal of metal from selected locations of the suspension member, and the resultant variations in suspension metal thickness, both reduce the weight of the suspension member and change its dynamic characteristics.

The unremitting advance towards ever lighter and more flexible suspension assemblies has resulted in suspensions of increasingly elaborate geometries. The tolerances required to achieve such geometries are rapidly approaching the process limits for photo-resist etching. While the depth of material removal is substantially a linear function related to the amount of time the metal surface is exposed to the chemical solvent, there are a number of variables that affect the ability to precisely control the amount of metal removed. Where, as here, extremely small tolerances are required, it becomes difficult to consistently achieve the required etch depth due to unavoidable variations in both temperature, etching time, and chemical contamination. In addition to variances in the concentration of the solvent, as well as the flow velocity of the solvent (or agitation), impurities in both the solvent and the metal being etched, and variances in the metal thickness, can all create process control problems that affect the end result of the fabrication process. As a result, there are practical limitations to the degree of control exercisable over the depth and shape of certain fine or small geometries formed in the suspension metal blank.

Accordingly, there is a need, in producing light, flexible, small suspension assemblies, for a process control technique that, when used with photo-resist etching, will permit a greater degree of control with respect to the etch depths achieved in the metal suspension assemblies.

SUMMARY OF THE INVENTION

The present invention provides a head suspension assembly (HSA) that is manufactured from a laminate or clad composite sheet metal having one or more layers formed therein that may be selectively used to stop or retard a chemical etching process. In limiting the amount of metal removed by a chemical solvent used in the photo-etch process, better control over the etching process can be obtained, thus enabling the chemical etching process to provide fine geometries in the head suspension that would otherwise not be possible given the variability inherent in the photo-etch process.

In accordance with the present invention, the etch-resistant material is embedded within conventionally-used sheet metal stock during its fabrication. This composite stock material may then undergo conventional, mechanical manufacturing processes that are used to create the disk drive suspensions. After the stock material has been subjected to the stamping, forming, and cutting operations, a photoresist material may be selectively applied to the surface of the shaped metal. An image will be photographically formed in the photo-resist layer, and the surface may then subjected to a chemical etching solution.

During the etching process the solvent will chemically react with and remove those areas of the metal surface not protected by the photoresist material, eventually reaching the etch-resistant layer. A material in this layer has been chosen on the basis of its having a lower reactivity in the presence of the etch solvent than the overlying stock material. This layer thus effectively "stops" the chemical etching process from proceeding further. In this manner, precise control over the depth to which the etching process proceeds may be achieved. This additional control will permit the formation of more precise geometric features within the stock material on a production basis than would otherwise be possible.

Additional features and advantages of the present invention are described in, and will be apparent from, the detailed description of the presently preferred embodiments and from the drawings.

DETAILED DESCRIPTION OF THE PREFERRED EMBODIMENTS

Disk drive systems utilize one or more heads that electromagnetically act with one or more recording disks mounted on a rotatable spindle. Head suspension assemblies are provided to support and position the heads over desired radial positions on the magnetic disks. Head suspension assemblies include several independent members, terminating at a point of attachment for a slider that carries a transducer head. In the art, three separate thin metal members are attached together to support the slider as they radially move over the magnetic medium. An actuator motor is provided to rotate the head suspension assembly over its range of radial positions, with the head suspension assembly attached to the motor by a "support" or "mount" plate member. This support plate member is fabricated out of a rigid material, such as stainless steel, to provide a solid support surface to which the other head suspension assembly members are attached.

The head suspension assembly members become progressively thinner and more flexible, with the next member, the "load beam," made of a thin piece of (typically) stainless steel of thickness between 0.03 to 0.08 mm. The load beam must be substantially inflexible horizontally—yet it cannot be as rigid as the support plate. The load beam must also be able to provide a vertical spring force reactive to the air-bearing force that supports the slider. The final support assembly member, known as the flexure, mechanically links the load beam to the slider. A flexure includes conventional means for maintaining a slider. Utilizing a metal sheet of minimal thickness, typically 0.02 mm. to 0.03 mm stainless steel, great performance demands are placed upon the flexure. The flexure must be extremely flexible in the vertical direction, permitting the slider to easily gimbal. At the same time, to enable the accurate radial positioning of the slider on the magnetic disk surface requires virtual absolute rigidity in the horizontal direction.

Figure 1:
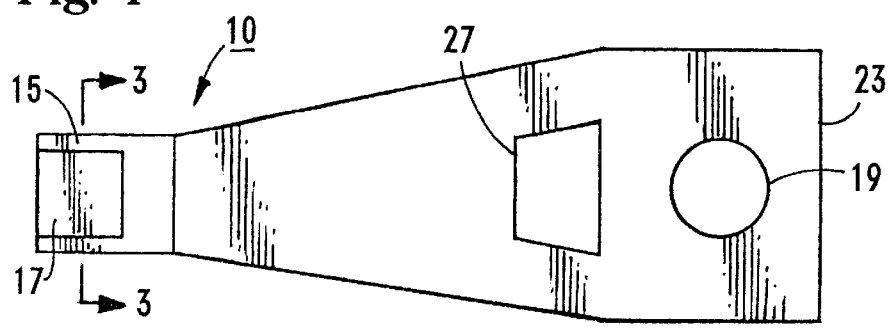
FIG. 1 is a top, plan view of a suspension assembly for a hard disk drive in accordance with the present invention.

Turning now to FIG. 1, a load beam 10 has one or more etched areas of reduced thickness located at a first end 17 thereof. One such etched area of reduced thickness is indicated by reference numeral 15. An attachment aperture 19 is formed in the load beam 10 adjacent a second end 23. When operating, the load beam 10 is attached to an actuator arm (not shown) by either a swage or rivet connector (not shown) received by and within the attachment aperture 19. An intermediate opening 27 may also be formed in the load beam 10, the placement and geometric shape of which is determined according to the desired changes in the bending moment of the load beam 10.

Figure 2:
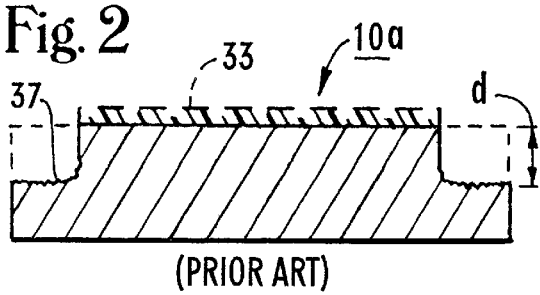
FIG. 2 is a cross-sectional view taken along Line 2—2 of FIG. 1, with portions in phantom, showing a suspension known to the prior art.

The geometric shape and location of the etched area 15 of reduced thickness, is likewise dictated by bending moment requirements. The prior art photo-etch process used to form the etched area 15 may be understood with reference to FIG. 2. As mentioned previously, the load beam is typically fabricated out of stainless steel, full or ¾ hard, Type 302 or 304, of a thickness between 0.02054 and 0.0762 mm. Since mechanical methods of shaping this or other types of stainless steel become impractical as thickness values approach 0.025 mm, it is well known to use photo-chemical etching to form delicate features on the load beam 10a.

In the prior art, a photo-etch resist pattern 33 (shown in phantom) is first applied to the load beam 10a, with the areas from which metal is to be removed remaining uncovered. Chemical etchants, such as ferric chloride, are then applied to the surface of the load beam 10a, forming an etched layer 37. The amount of metal removal (depicted reference letter "d" in FIG. 2) is dependent upon such factors as the etchant concentration, the processing temperature, and the exposure time of the chemical etchant to the metal. Each of these criteria can vary according to the skill and knowledge of the practitioner. Nevertheless, practical limitations are reached with respect to precision control of the depth and shape of the etching process. The non-linear depiction of the etched surface 37 reflects the surface variability in the amount of metal removed. At the conclusion of the etching process, the photo-etch resist layer 33 is chemically removed from the load beam 10a.

THE INVENTION

Figure 3A:
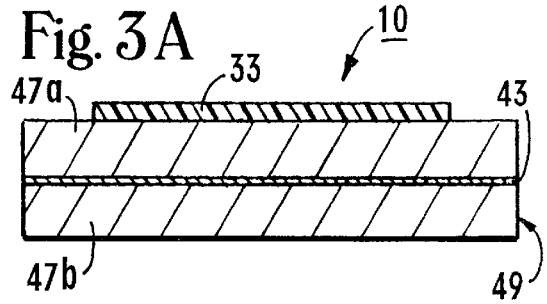
FIG. 3A is a cross-sectional view taken along Line 3—3 of FIG. 1, showing a suspension of the present invention prior to chemical etching.

To address the inherent variability in thickness of the etched layer, the load beam 10 in FIG. 3A is shown having an etch-stop layer 43 sandwiched between a pair of metallic layers 47. Together with the metallic layers 47, the etch-stop layer 43 forms a metal laminate blank 49. Although not shown in the Figures, the metal laminate blank 49 may be subjected to the conventional mechanical manufacturing steps involved in fabricating load beams for hard disk suspensions, including: stamping, forming, and cutting. The metal laminate blank 49 is of most benefit when photo-chemical etching processes are used to shape the metal laminate into the delicate geometries desired for the load beam.

In a known manner, the photo-etch resist layer 33 is applied to one or more surfaces of the metal laminate blank 49. When the metallic layers 47 are stainless steel of the type described above, a dry or liquid photo-resist material may form a suitable photo-resist layer. After application, an overlying pattern may be placed upon the layer and the masked photo-etch resist may then be exposed to a light source to create a desired pattern image on the photo-resist layer 33. A solvent, such as one comprising ferric chloride may then be applied to the surface to remove the unexposed portions. With the desired pattern formed in the photo-resist layer 33, the chemical etching solution may then be applied to the metal laminate blank 49.

Figure 3B:
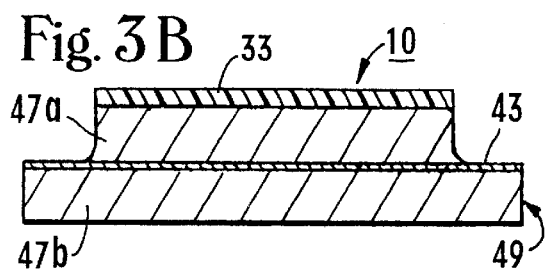
FIG. 3B is a cross-sectional view similar to FIG. 3A, showing a suspension of the present invention after chemical etching.

Turning now to FIG. 3B, the metal laminate blank 49 has been subjected to an etching operation, chemically dissolving those portions of the upper metallic layer 47a not covered by the photo-etch resist layer 33. While the etching process itself is known to the prior art, the use of the etch-stop layer 43 is not. The etch-stop layer 43 permits significantly greater precision and control over the desired dimensions and geometries in the load beam 10. Having been selected from a material that is resistant to the chemical etching solvent, the non-reactive surface of the etch-stop layer 43 slows, if not terminates, the etching process. Thus, by the careful placement of the etch-stop layer 43, control over the desired depths, features, and shapes required to form the load beam 10 is less susceptible to variations in chemical exposure time, etching solution impurities, temperature fluctuations, gelatinousness, and other variables that affect the chemical etching process.

Figure 3C:
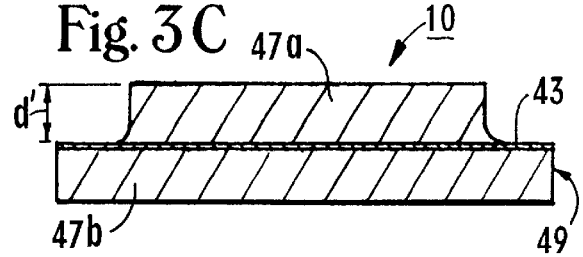
FIG. 3C is a cross-sectional view similar to FIGS. 3A and 3B, showing a suspension of the present invention after removal of a photoetch resist pattern from a surface of the suspension.

Upon completion of the chemical etching, the photo-etch resist layer 33 is removed using known solvents appropriate for the particular resist layer material used. FIG. 3C illustrates the resulting load beam structure. In comparison with the prior art load beam 10a (FIG. 2), the etching depth d' is considerably more uniform over the etched layer than is the case where no etch-stop layer 43 is utilized. Although exaggerated in the Figures for illustrative purposes, partial etching yields surface variations of up to ±10% of original thickness using prior art etching techniques without an etch-stop layer. The etch-stop layer 43 reduces such variations to ±4% of original thickness.

Figure 4:
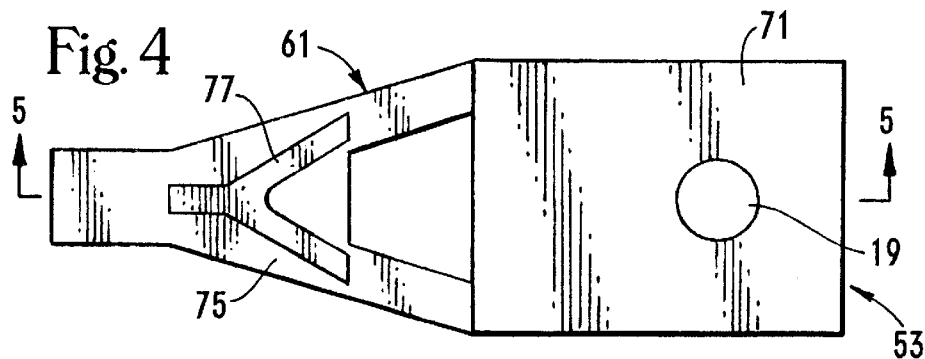
FIG. 4 is a top, plan view of an alternative embodiment of a suspension assembly of the present invention.
Figure 5:
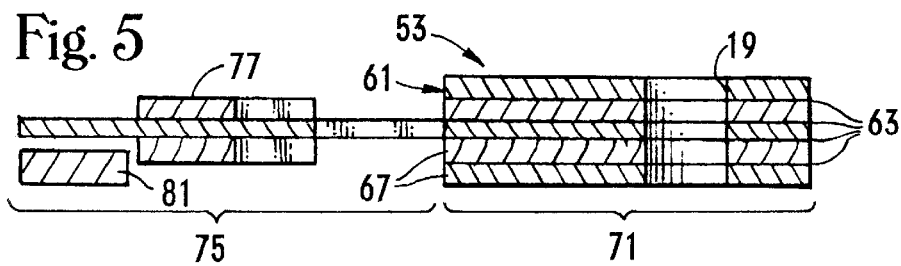
FIG. 5 is a cross-sectional view taken along Line 5—5 of FIG. 4.

The present invention also contemplates the use of multiple stop layers imbedded within a metal laminate, permitting the creation of patterns having various metal layer thicknesses. A multiple metal-layered suspension 53 for use with hard disk drives is shown in FIGS. 4 and 5. A laminate stock 61 having a plurality of layers of an etch-retardant material 63, each sandwiched between a corresponding pair of metal layers 67 is subjected to a multi-step photo-etching process with sequential metal removing processing steps to fabricate the desired pattern and thicknesses on the metal layered suspension 53. After application of a first photo-etch resist pattern (not shown), the etching solution is applied until the first etch-stop layer is encountered. When the etch-stop layer is encountered, a second solvent can then be applied to chemically react with and remove the exposed etch-stop layer. For example, assume that the etch-stop layer comprises a thin tungsten sheet. In this case, potassium ferro-cyanide will remove the etch-stop layer. For a gold etch-stop layer, potassium iodide may be used. After removal of stop layer material, the chemical etching solution can be reapplied to dissolve the now-exposed metal layer. Alternatively, the photo-etch resist layer can be removed and replaced with a different resist pattern, which in turn is etched into the metal. Thus, the selective application of etching solutions and/or etch-retardant material permits fabrication of the metal-layered suspension 53 into various patterns and thicknesses.

In FIGS. 4 and 5, for example, this fabrication technique results in the utilization of the multi-layered laminate stock 61 to form an entire suspension assembly. That portion of the metal-layered suspension 53 that was least etched, i.e., the thickest portion, forms a mount plate 71. This area of maximum thickness, having the most metal layers remaining after the chemical etching process is completed provides the structural strength needed at the point of attachment between the suspension system and the actuator arm (not shown). The remaining portion of the multi-layered suspension 53 consists of a flexure 75. In FIGS. 4 and 5 the flexure 75 is shown as consisting primarily of a single metal layer. Additionally, the photo-etch resist process has been utilized to create a geometric aperture 76 formed in the flexure 75, and to provide a geometric patter of increased thickness, forming a stiffener 77. By the appropriate selection of both the pattern and the thickness value, the stiffener 77 may be used to fine tuning of the spring-like force required to balance the forces generated by an attached slider 81 when the slider 81 "flies" over a rotating magnetic disk. Thus, the precise shape of the stiffener 77 will vary in accordance with the overall design of the metal-layered suspension 53, with the resulting design intended to permit the head/slider 81 to pitch and roll as required to best track the surface of the rotating magnetic medium (not shown in the Figures). It is further believed that by constructing the metal-layered suspension 53 out of the multiple-layered laminate stock 61, the resulting sandwiched metal may also have desirable damping characteristics.

The laminate stock of the present invention can be fabricated by several different methods. In a preferred process, the etch-stop material, such as tungsten or gold, is sputtered on the surface of a clean metal sheet of full hard or ¾ hard type 302 or type 304 stainless steel. The sheet, with the deposited etch-stop layer, is then rolled against another stainless steel metal sheet in a cladding operation, thereby bonding the sheets together. In addition to tungsten and gold, other metals can also serve as the etch-stop material, including nickel. Also, other deposition processes besides sputtering can be used to apply the etch-stop layer, such as evaporation, plasma deposition, or plating. Ideally, the resulting etch-stop layer need only be a few atoms in thickness.

Alternatively, a thin layer (1–7 microns' thickness) of an adhesive material, such as a thermoplastic polyimide, can be used to form the etch-stop layer, as well as to bond the two metal layers together. In this case, it is immaterial as to whether the adhesive material is itself inert to the chemical etching solution, or whether the adhesive has the etch-stop material added/mixed therein. An example of such a bonding material that also functions as an etch-stop is the family of epoxy adhesives, sold as Hysol epoxy, manufactured by Mitsui Corporation. It is contemplated that other adhesive materials might also be useful in this regard.

It is also contemplated under the present invention that the etchstop layer need not be a continuous layer between the bonded metal layers. The etch-stop material can be applied in a manner that forms a pattern, resulting in the etching of the metal being stopped only in certain desired areas. For example, where the etch-stop layer is sputtered on one of the metal surfaces, the extreme thinness of the layer permits the photo-chemical etching process to create apertures in the metal laminate substrate. Where only one etch-stop layer is provided, the selective application of the chemical etching solution to both sides of the metal laminate at a co-located position will result in the formation of a hole in the metallic laminate.

Where the etch-stop material forms a layer having a different color or lustre from the surrounding metal layers, the task of measuring the thickness of the metal after etching is considerably simplified over the prior art. Previously, with the variations in the rate of etching inherent in the chemical etching process, the degree or depth to which the etching process had penetrated was not always apparent. However, under the present invention, by using an etch-stop material of a different color or lustre from the base metal layer, the point at which the etching process is complete may readily be visually determined.

Finally, by the selection of the particular etch-stop layer, it is also possible to provide either an electrically insulating layer or a conductive path for electricity. For example, by creating the etch-stop layer out of a poorer conductor of electricity, such as niobium or cobalt, a relatively non-conductive layer is formed in the suspension that provides a degree of electromagnetic shielding in the embedded etch-stop layer.

Figure 6:
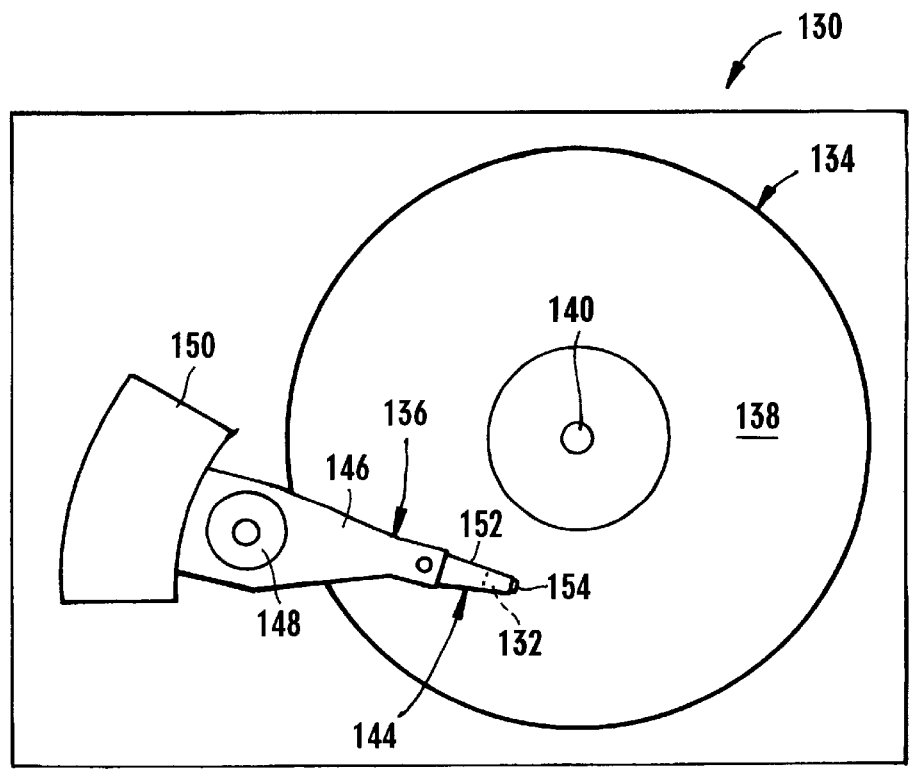
FIGS. 6, 7, and 8 illustrate a magnetic disk drive which includes a head suspension assembly constructed according to the invention.
Figure 7:
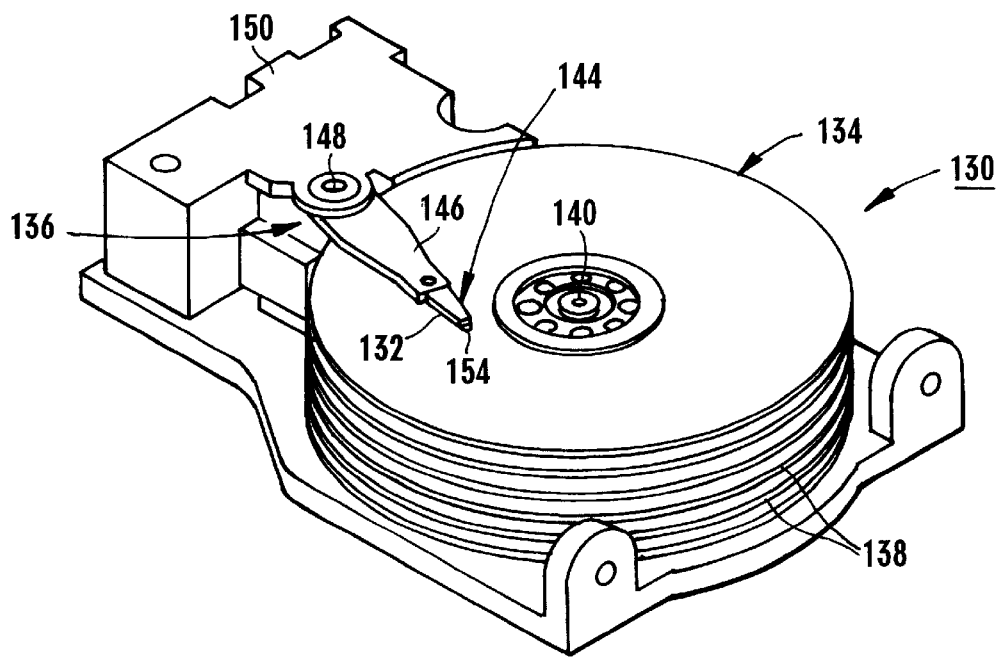
Figure 8:
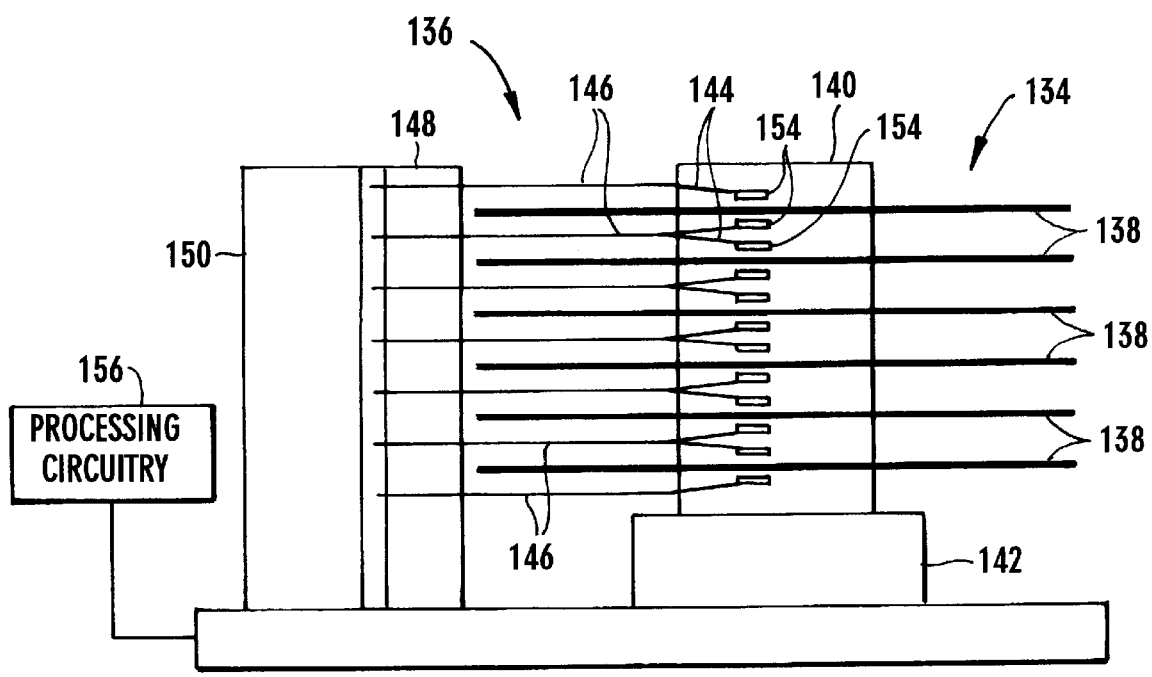

Referring now to FIGS. 6, 7, and 8, there is illustrated a magnetic disk drive 130 which employs a head/suspension assembly (HSA) 132 that includes a load beam embodying this invention. The disk drive has a disk stack assembly 134 and a head stack assembly 136. The disk stack assembly 134 includes a plurality of vertically stacked disks 138 which are supported for rotation on a spindle 140, the spindle 140 being rotated by a motor 142. The head stack assembly 136 includes a plurality of vertically stacked suspensions 144, each suspension being mounted to a respective actuator arm 146. Each actuator arm 146 is mounted for rotation on an actuator hub 148 which is selectively rotated by a voice coil 150. Each suspension 144 includes a respective HSA 132 and a load beam 152, the HSA being mounted on the load beam as will be explained in more detail hereinafter. The load beam 152 of each HSA 132 has mounted to it a slider 154 which carries a magnetic head (not shown) for reading and writing magnetic signals on the disk 13. Processing circuitry 156 is operatively connected to the motor 142, the voice coil 150, and the magnetic heads for rotating the disks 138, selectively rotating the actuator arms 46, and reading and writing on the disks, respectively. When the voice coil 150 is operated, the magnetic heads on the slider 154 are moved to selected circular tracks on the disks where information is magnetically read and magnetically written by the heads. Because of direct access to these circular tracks by simple rotation of the actuator arms 146, this type of storage device is known as a direct access storage device (DASD).

Each HSA 132 includes a load beam 152 built according to this invention. Each load beam 152 preloads a respective slider 154 on a surface of a disk 138. When the disks 138 are rotated, each disk creates a cushion of air (an "air bearing") which counterbalances preloading of the load beam 152, causing a slider to fly slightly off of the surface of a disk, in the order of 0.075 microns. The surface of the slider supported by this air bearing is known as an air bearing surface (ABS). In some applications, the surface of the disk 38 may be provided with a lubricant allowing the ABS of the slider to slightly contact the surface of the disk when the disks are rotated. The HSA 132 allows for slight movements in pitch and roll of the slider 154 during rotation of the magnetic disk 138.

It should be understood that various changes and modifications to the presently preferred embodiment that are described herein will be apparent to those skilled in the art. Such changes and modifications can be made without departing from the spirit and scope of the present invention and without diminishing its attendant advantages. It is therefore intended that such changes and modifications be covered in the appended claims.

What is claimed is:

1. A suspension assembly having a first end for coupling to an actuator arm and an opposite second end for supporting a transducer thereon comprising:

a suspension member formed from a multilayer metal laminate stock, the suspension member having a mount plate area defined therein, the mount plate area being configured for coupling to an actuator arm, said mount plate area comprising:
   a plurality, of metal layers clad to one another, and
   at least one etch retardant layer received between a first pair of said plurality of metal layers; and
   said etch retardant layer is a metal selected from the group consisting of gold, tungsten, and nickel.

2. A suspension assembly as defined in claim 1, wherein said mount plate area further comprises:

a second pair of said plurality of metal layers; and a second etch retardant layer received between said second pair of said plurality of metal layers.

3. A suspension assembly as defined in claim 2, wherein an aperture is defined through said mount plate area.

4. A suspension assembly as defined in claim 2, the suspension member further having a flexure area defined therein said flexure area comprising:
   a portion of at least one metal layer of said first pair of said plurality of metal layers;
   at least a metal layer not in the mount plate area;
   at least one etch retardant layer received between the portion and the metal layer not in the mount plate area.

5. A suspension assembly as defined in claim 1, wherein an aperture of predetermined geometric shape is defined within said flexure area.

6. A suspension assembly as defined in claim 1, wherein said metal layers comprise stainless steel.

7. A head suspension assembly for a hard disk drive comprising:

a load beam;

the load beam formed from a multi-layer metal laminate stock, the load beam having a mount plate area, the mount plate area being configured for coupling to an actuator arm;

said mount plate area comprising:
   a plurality of metal layers clad to one another; and
   at least one etch retardant layer received between a first pair of said plurality of metal layers; and
   said etch retardant layer is a metal selected from the group consisting of gold, tungsten, and nickel.

8. A suspension assembly as defined in claim 7, wherein said mount plate area further comprises:

a second pair of said plurality of metal layers; and a second etch retardant layer received between said second pair of said plurality of metal layers.

9. A suspension assembly as defined in claim 8, wherein an aperture is defined through said mount plate area.

10. A suspension assembly as defined in claim 8, the suspension member further having a flexure area defined therein, said flexure area comprising:

a portion of at least one metal layer of said first pair of said plurality of metal layers;

at least a metal layer not in the mount plate area;

at least one etch retardant layer received between the portion and the metal layer not in the mount plate area.

11. A suspension assembly as defined in claim 7, wherein an aperture of predetermined geometric shape is defined within said flexure area.

12. A suspension assembly as defined in claim 7, wherein said metal layers comprise stainless steel.

* * * * *

UNITED STATES PATENT AND TRADEMARK OFFICE
CERTIFICATE OF CORRECTION

PATENT NO. : 6,215,622 B1
DATED : April 10, 2001
INVENTOR(S) : Ruiz et al.

It is certified that error appears in the above-identified patent and that said Letters Patent is hereby corrected as shown below:

<u>Title page,</u>
Item [56], References Cited, "5,313,365" should be -- 5,313,355 --

Signed and Sealed this

Twenty-ninth Day of October, 2002

*Attest:*

*Attesting Officer*

JAMES E. ROGAN
*Director of the United States Patent and Trademark Office*